United States Patent
Abe

(10) Patent No.: US 6,580,804 B1
(45) Date of Patent: Jun. 17, 2003

(54) PIXEL-BASED DIGITAL WATERMARKS LOCATED NEAR EDGES OF AN IMAGE

(75) Inventor: Yasushi Abe, Kanagawa (JP)

(73) Assignee: Ricoh Co., LTD, Tokyo (JP)

( * ) Notice: Subject to any disclaimer, the term of this patent is extended or adjusted under 35 U.S.C. 154(b) by 0 days.

(21) Appl. No.: 09/369,081

(22) Filed: Aug. 5, 1999

(30) Foreign Application Priority Data

Aug. 7, 1998 (JP) ............................................ 10-236315

(51) Int. Cl.$^7$ ................................................ G06K 9/00
(52) U.S. Cl. ........................ 382/100; 713/176; 713/179
(58) Field of Search ................................ 382/100, 232; 380/54, 210, 252, 287, 51; 713/176, 179; 370/522, 523, 524, 525, 526, 527, 529; 348/461, 463; 725/20; 704/273; 381/73.1; 386/94

(56) References Cited

U.S. PATENT DOCUMENTS 5,646,997 A * 7/1997 Barton ........................ 713/176
5,764,770 A * 6/1998 Schipper et al. ............. 713/176
5,809,160 A * 9/1998 Powell et al. ................ 382/100
6,069,914 A * 5/2000 Cox ............................ 375/150
6,181,802 B1 * 1/2001 Todd ........................... 382/100

FOREIGN PATENT DOCUMENTS

JP          9-191394         7/1997

* cited by examiner

Primary Examiner—Timothy M. Johnson
Assistant Examiner—Abolfazl Tabatabai
(74) Attorney, Agent, or Firm—Knoble & Yoshida, LLC

(57) ABSTRACT

Predetermined information as a digital watermark is encoded near or substantially on edges of digital images. The application of this technique is particularly suited for binary images such as text since the embedded digital watermark does not significantly affect the appearance of the text. The embedded digital watermark is decoded to confirm the origin of the digital image even if only a portion of the original digital image is copied.

26 Claims, 20 Drawing Sheets

| | |
|---|---|
| CORRECT BLOCK | 1010101010101010 |
| DECODED RESULT 1 | 1011101010100010 |
| DECODED RESULT 2 | 1010101010101010 |
| DECODED RESULT 3 | 1010101011010010 |
| CONVERGED BIT RESULT | 1010101010101010 |

PIXEL-BASED DIGITAL WATERMARKS LOCATED NEAR EDGES OF AN IMAGE

FIELD OF THE INVENTION

The current invention is generally related to digital watermarks, and more particularly related to pixel-based digital watermarks located near or substantially along edges of an image to be encoded.

BACKGROUND OF THE INVENTION

In general, it is easy to duplicate digital image data. In recent years, with the proliferation of the internet along with the growing network infrastructure, image databases such as in electronic libraries and other web sites are also readily available to the public. Once digital images are available to a network user, it is difficult to enforce copyrights to prevent the images from being copied. In fact, because the images are digitized, the image duplication is generally unlimited and distributed for potential more duplication. Although there is some law in Japan to prohibit the duplication of certain images such as stock certificates and bank note, it is practically impossible to deter the duplication of images.

In order to solve the above described problems, digital watermarks have been considered. In general, there are two ways to implement digital watermarks. One earlier group of prior art attempts has implemented digital watermarks based upon pixel modifications of images. Although this approach is relatively straight forward, digital watermarks encoded in this manner are susceptible to image processing such as enlargement, reduction and rotation and images are not later correctly decoded. Because of these short comings, prior art has taught away from the use of pixel modification in encoding digital watermarks. The other later group of prior art attempts has involved the use of frequency in an image in encoding digital watermarks. For example, Japanese Patent Laid Publication Hei 9-191394 has disclosed the use of Fourier transformation in encoding information to represent digital watermarks in images. However, since Fourier transformation is calculation-intensive, the processing time is too long for practical use. In addition, if a part of the image is deleted from the encoded image, it is not possible to decode the encoded image. This is because images are generally not uniform in frequency characteristics, and in particular, parts of the image have different low frequency characteristics.

It is desired to improve a method of and a system for encoding a digital watermark in an image and decoding the digital water mark so as to make the digital watermark more resistant to image processing and or image deletion without an inordinate amount of calculation.

SUMMARY OF THE INVENTION

In order to solve the above and other problems, according to a first aspect of the current invention, a method of placing a digital watermark in an image, includes the acts of: determining a set of predetermined contiguous pixel patterns of a particular size and at least another set of corresponding predetermined modified contiguous pixel patterns; inputting an input image containing an image and image edges along the image; detecting one of the predetermined contiguous pixel patterns in each of the pixel blocks in the input image; and modifying the input image substantially along the image edges of the input image so as to encode the digital watermark based upon the detected one of the predetermined contiguous pixel patterns and the corresponding predetermined modified contiguous pixel patterns.

According to a second aspect of the current invention, a system for placing a digital watermark in an image, includes: a pixel pattern storage unit for storing a set of predetermined contiguous pixel patterns of a particular size and at least another set of corresponding predetermined modified contiguous pixel patterns; an input unit for inputting an input image, the input image containing an image and image edges along the image; and an encoder unit connected to the pixel pattern storage unit for detecting one of the predetermined contiguous pixel patterns in the input image and for modifying the input image substantially along the image edges of the input image so as to encode the digital watermark based upon the detected one of the predetermined contiguous pixel patterns and the corresponding predetermined modified contiguous pixel patterns according to the encode information.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 15 illustrates that the decoded results from the multiple blocks are converged into one result.

DETAILED DESCRIPTION OF THE PREFERRED EMBODIMENT(S)

Figure 1:
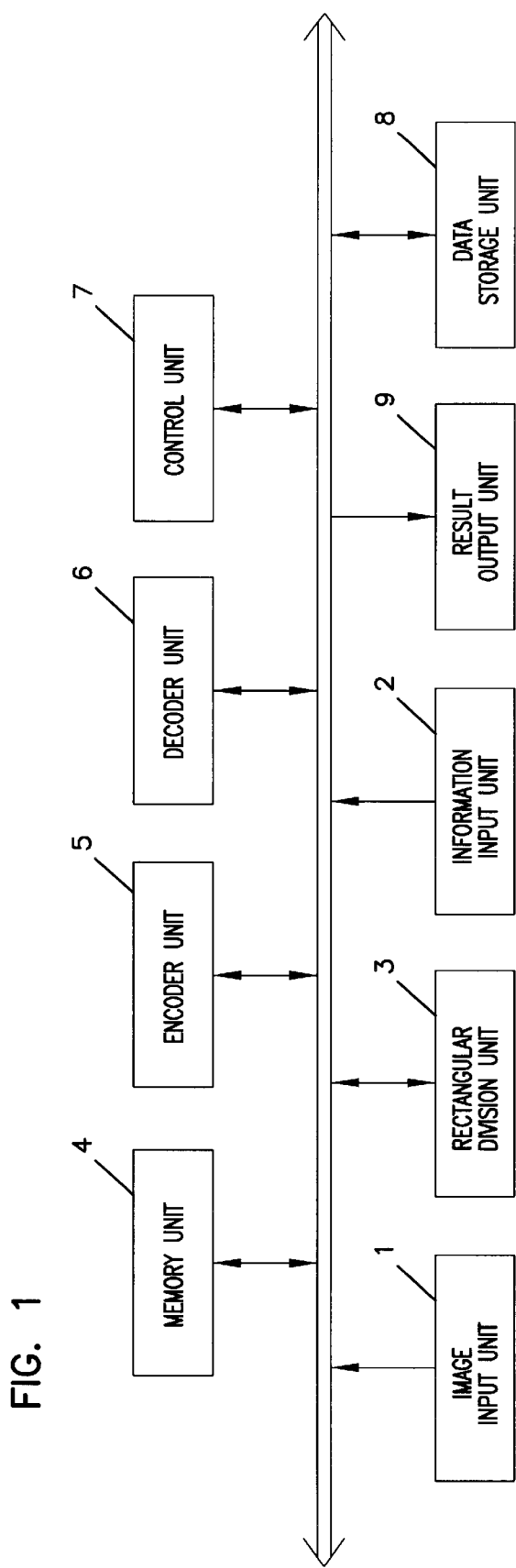
FIG. 1 is a block diagram illustrating one preferred embodiment of the pixel-based digital watermarks system for placing a digital watermark near or substantially along edges of an image according to the current invention.

Referring now to the drawings, wherein like reference numerals designate corresponding structure throughout the views, and referring in particular to FIG. 1, a block diagram illustrates one preferred embodiment of the pixel-based digital watermarks system for placing a digital watermark near or substantially along edges of an image according to the current invention. An image input unit 1 inputs image data into the system via bus line or communication line, and the input images include both document images as well as non-textual images on which digital watermarks information is encoded. An information input unit 2 inputs predetermined information to be embedded in the input image as a digital watermark. The digital watermarks are either an image or a bit sequence. A rectangular division unit or an input image divider unit 3 divides the input image into rectangular blocks of a predetermined size. For example, the predetermined size is 255 pixels by 255 pixels. Furthermore, the rectangular division unit 3 selectively divides a portion of the input image that contains image data. In other words, the rectangular division unit 3 first selects a rectangular portion that contains image data and excludes image portion that substantially lacks image data before dividing the selected rectangle into blocks of a predetermined size. An encoder unit 5 encodes a predetermined set of information in the blocks of the image as a digital watermark while a decoder unit 6 extracts the encoded digital watermark. A result output unit 9 outputs the extracted information. An information input unit 4 stores the information or the digital watermark to be encoded. A memory unit 4 holds the image data, the digital watermark and the extracted information while the encoder unit 5 and the decoder unit 6 process the information. A data storage unit 8 stores the digital image data after the image data is inputted from the image input unit 1. A control unit 7 controls the above described units to coordinate the encoded as well as decoded processes.

Figure 2:
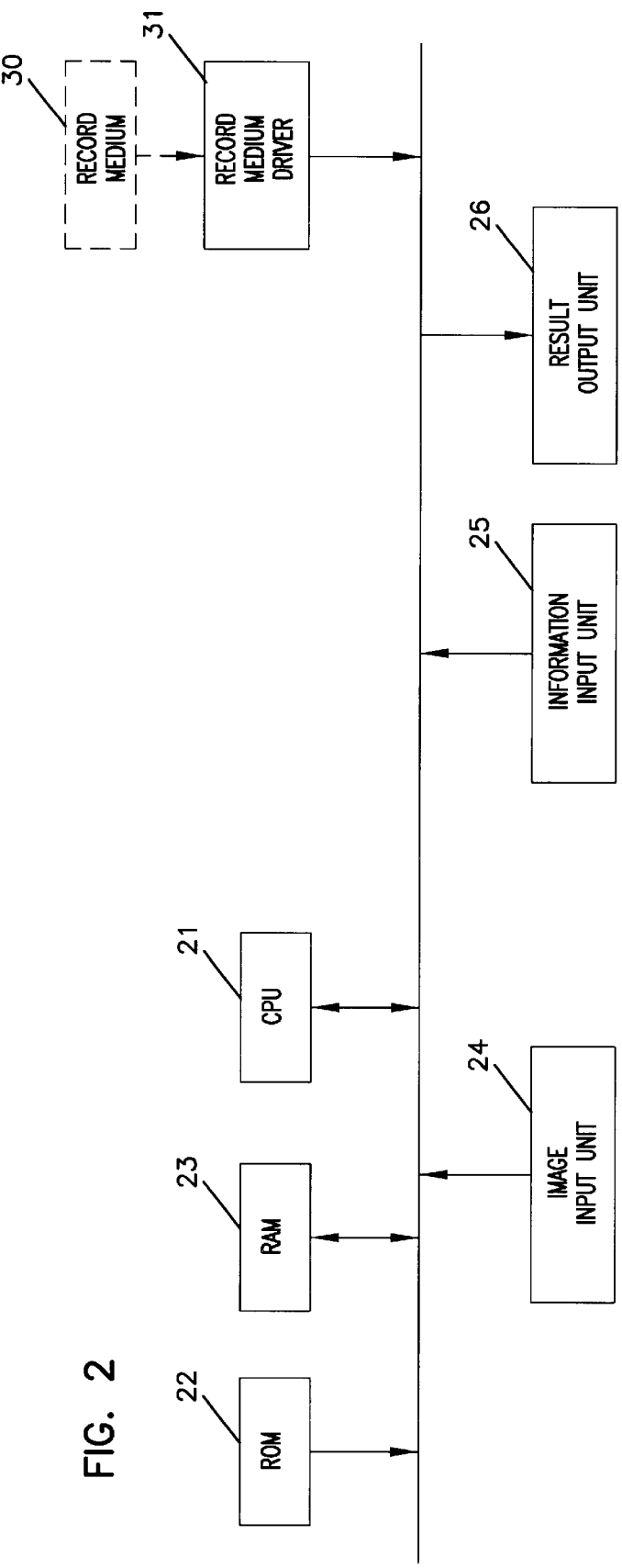
FIG. 2 is a block diagram illustrating a second preferred embodiment of the pixel-based digital watermarks system for placing a digital water mark near or substantially along edges of an image according to the current invention.

Referring to FIG. 2, a block diagram illustrates a second preferred embodiment of the pixel-based digital watermarks system for placing a digital water mark near or substantially along edges of an image according to the-current invention. The second preferred embodiment includes a central processing unit (CPU) 21 such as in a personal computer, a read only memory (ROM) 22 for storing data and executable as well as a random access memory (RAM) 23 for temporarily storing data and executable while the CPU 21 executes the program instructions for dividing the input image into blocks, encoding digital watermark information into the blocks and decoding the digital watermark information from the image. The second preferred embodiment also includes an image input unit 24 such as a scanner for inputting an image and an information input unit 25 for inputting information such as a digital watermark to be encoded. A result output unit 26 such as a display unit and a printer outputs the decoded information. The above described program instructions are packaged in software, and the software package is delivered in a record medium such as CD-ROM via a record medium driver 31. The software package is optionally stored in ROM 22, RAM 23, a floppy disk as well as a memory card.

Figure 3A:
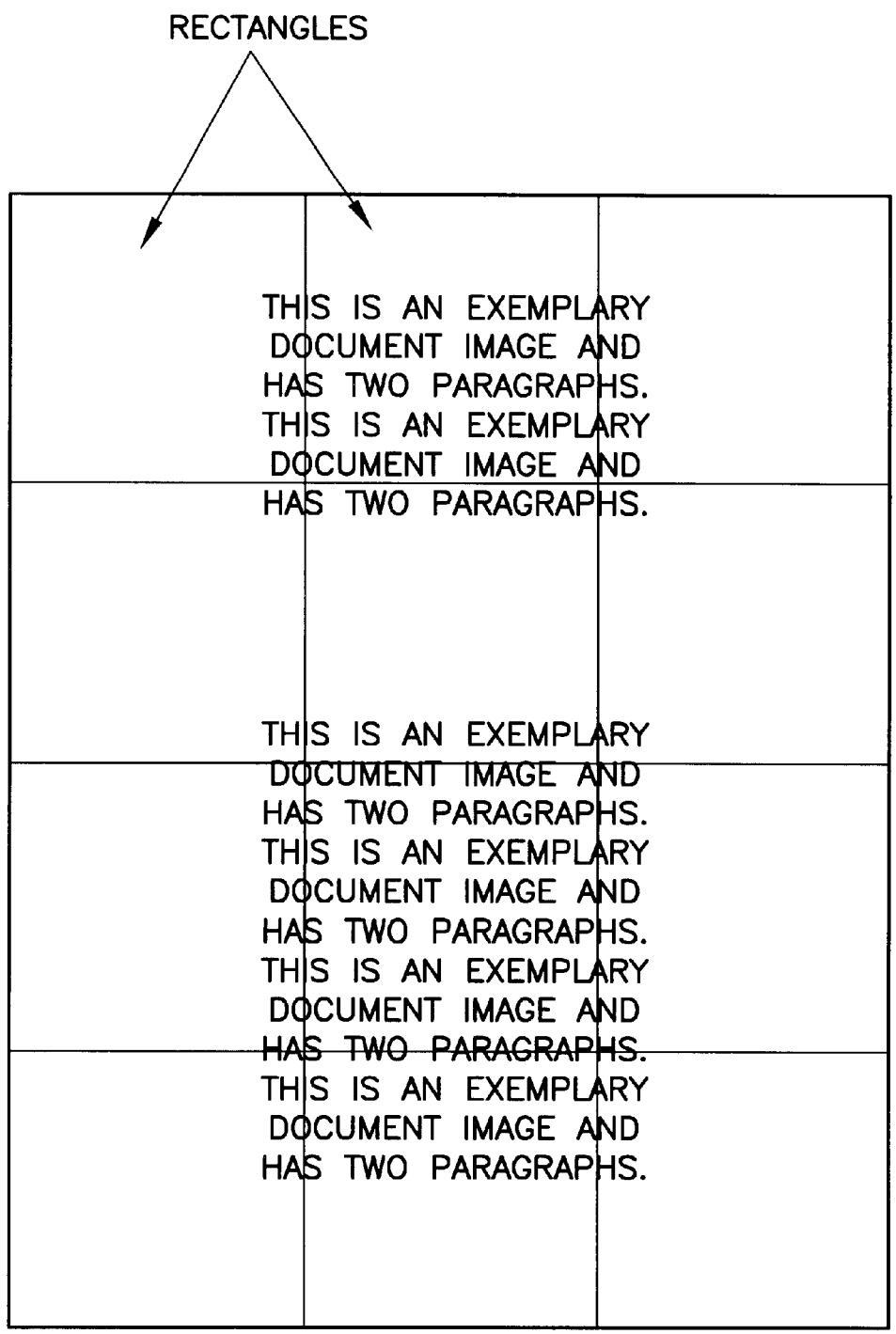
FIG. 3A illustrates results of one implementation of the division unit of the first preferred embodiment or the program instructions of the second preferred embodiment.
Figure 3B:
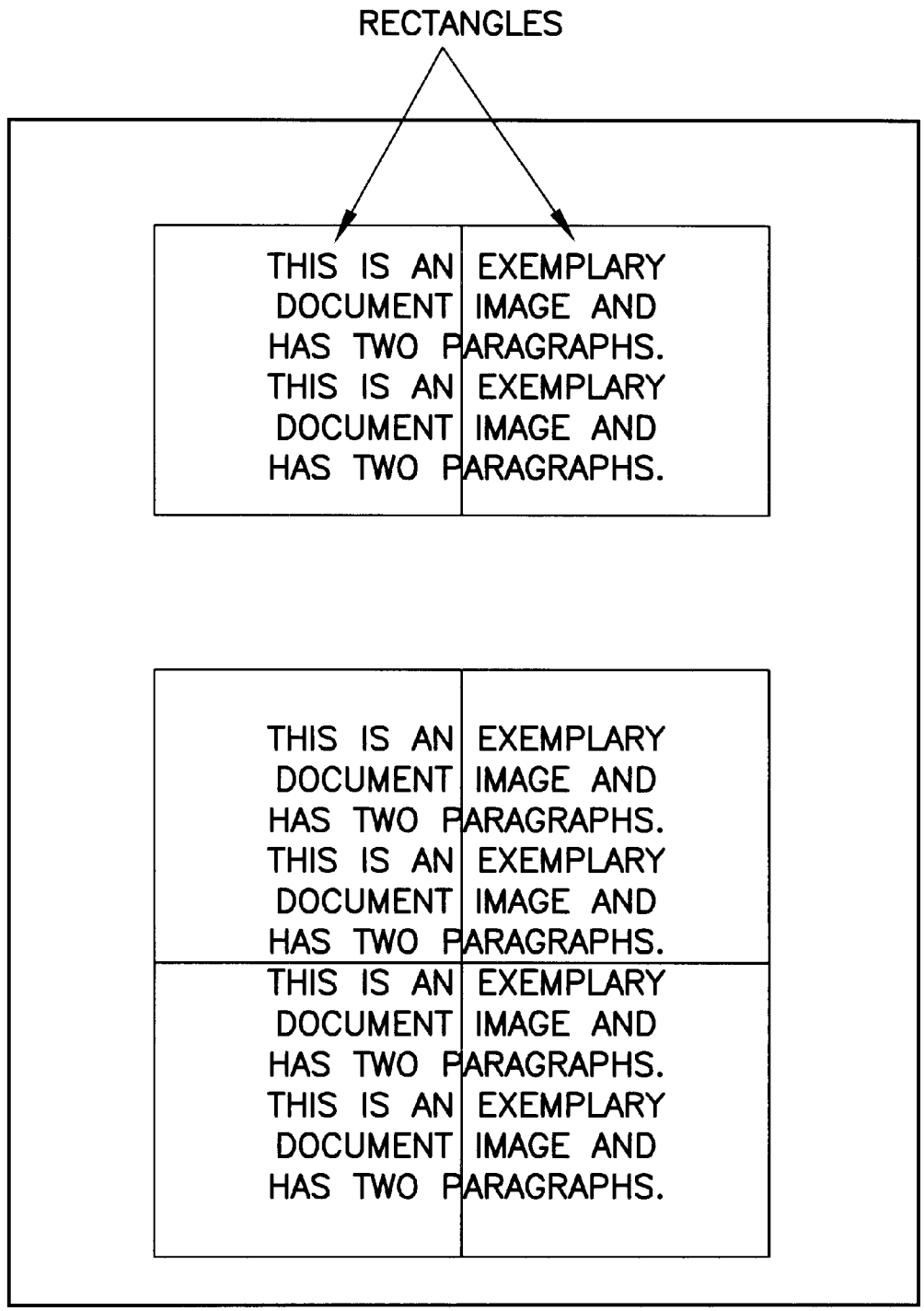
FIG. 3B illustrates results of another implementation of the division unit of the first preferred embodiment or the program instructions of the second preferred embodiment.

Now referring to FIG. 3A, one implementation of the division unit 3 of the first preferred embodiment or the program instructions of the second preferred embodiment are further described with illustrations. One implementation divides an image into blocks or rectangles of a predetermined size regardless of image distribution or data concentration within the inputted image data. Optionally, referring to FIG. 3B, another implementation of the division unit 3 of the first preferred embodiment or the program instructions of the second preferred embodiment divides an image into blocks of a predetermined size based upon image distribution or data concentration within the inputted image data. The second implementation initially determines areas with substantial image data and excludes areas without any substantial image data. The second implementation then divides the image containing areas into blocks of a predetermined size, and only these image-containing blocks are used for encoding or decoding processes. Since only image-containing blocks are encoded with predetermined digital watermark information near edges, the exclusion of image areas with substantially no image data increases efficiency in both encoding and decoding processes.

Figure 4:
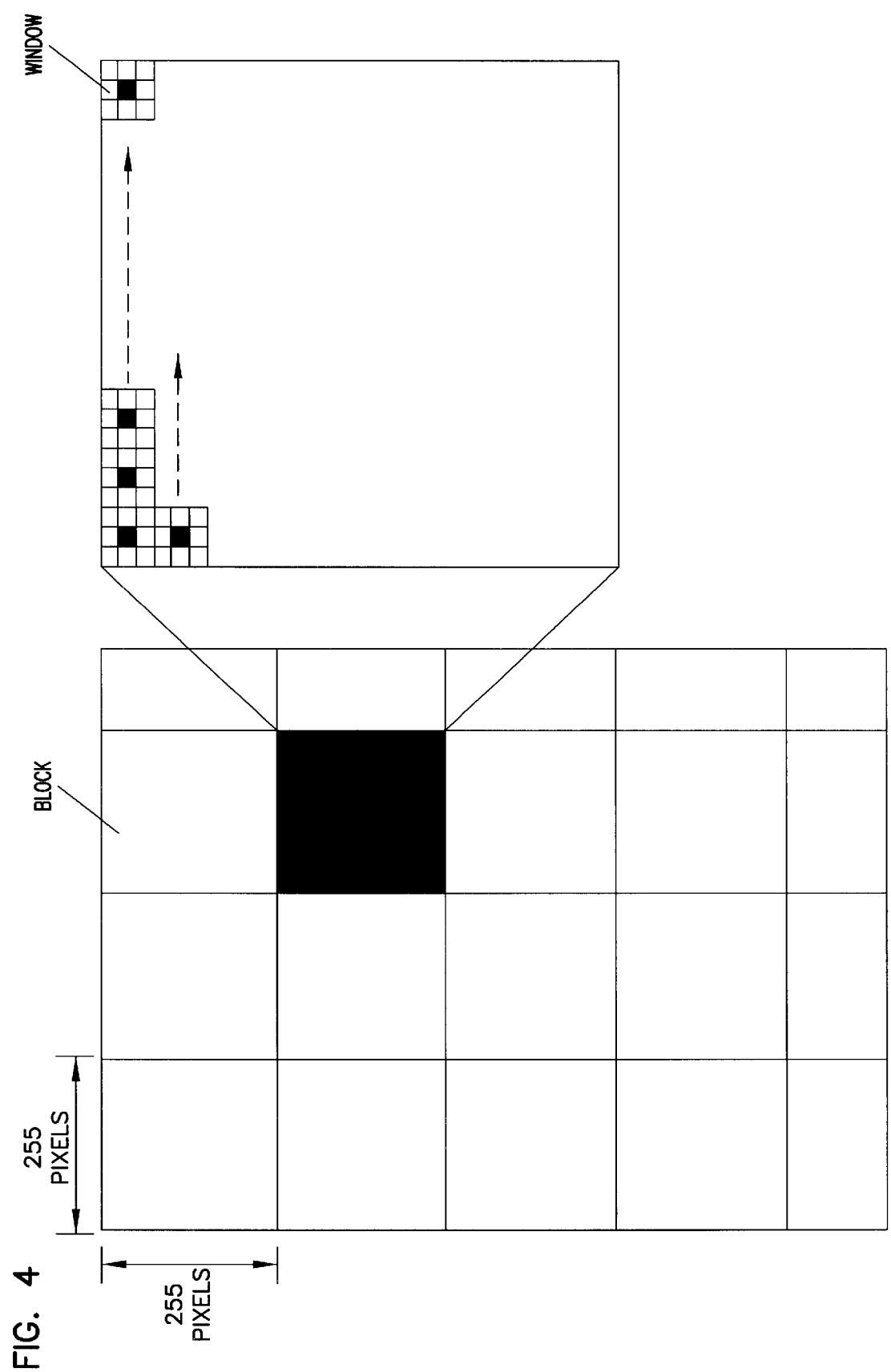
FIG. 4 illustrates that the encoder unit of the first preferred embodiment scans pixel patterns in a raster direction with each block until all blocks are scanned.

Referring to FIG. 4, after the blocks are determined, the encoder unit 5 of the first preferred embodiment scans pixel patterns in a raster direction with each block until all blocks are scanned. An example is illustrated that the encoder 5 now scans a 255-by-255 pixel block which is located on a second row and a third column. With in the block, a 3-by-3 pixel window is moved in a raster fashion or left-to-right and top-to-bottom as indicated by arrows in order to detect one of predetermined contiguous pixel patterns. When the 255-by-255 pixel block is scanned in the above described manner, an adjacent pixel block of the same size is scanned in the same manner until all the pixel blocks are scanned. In this example, the encoding frequency is 3 pixels while the block size is 255-by-255 pixels. Since the block size is a multiple of the encoding pixel window size, the encoded information is prevented from being discontinuous on the block boundaries.

Figure 5A:
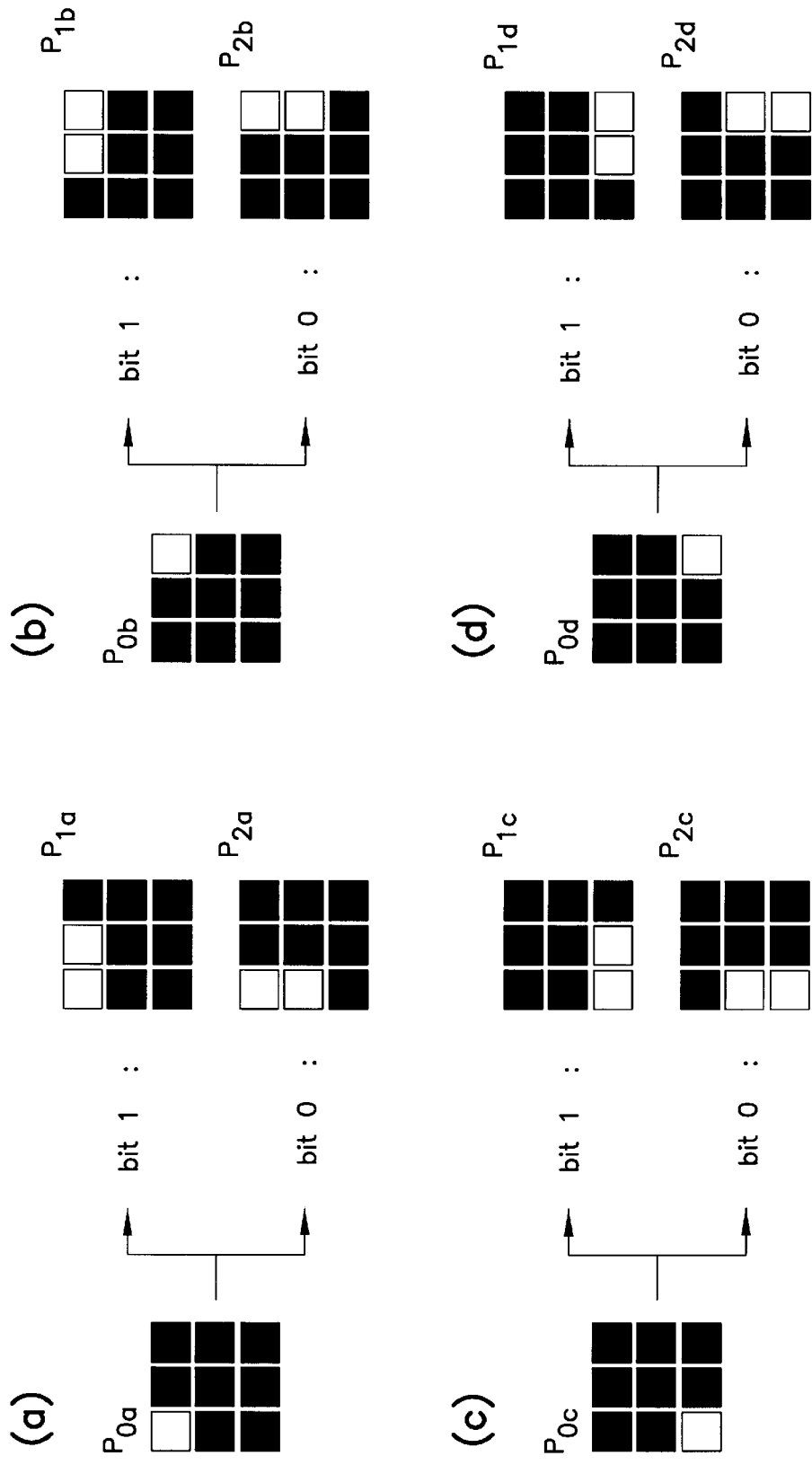
FIGS. 5A–5C illustrate a complete set of predetermined contiguous pixel patterns and corresponding predetermined modified contiguous pixel patterns so as to encode a digital watermark.
Figure 5B:
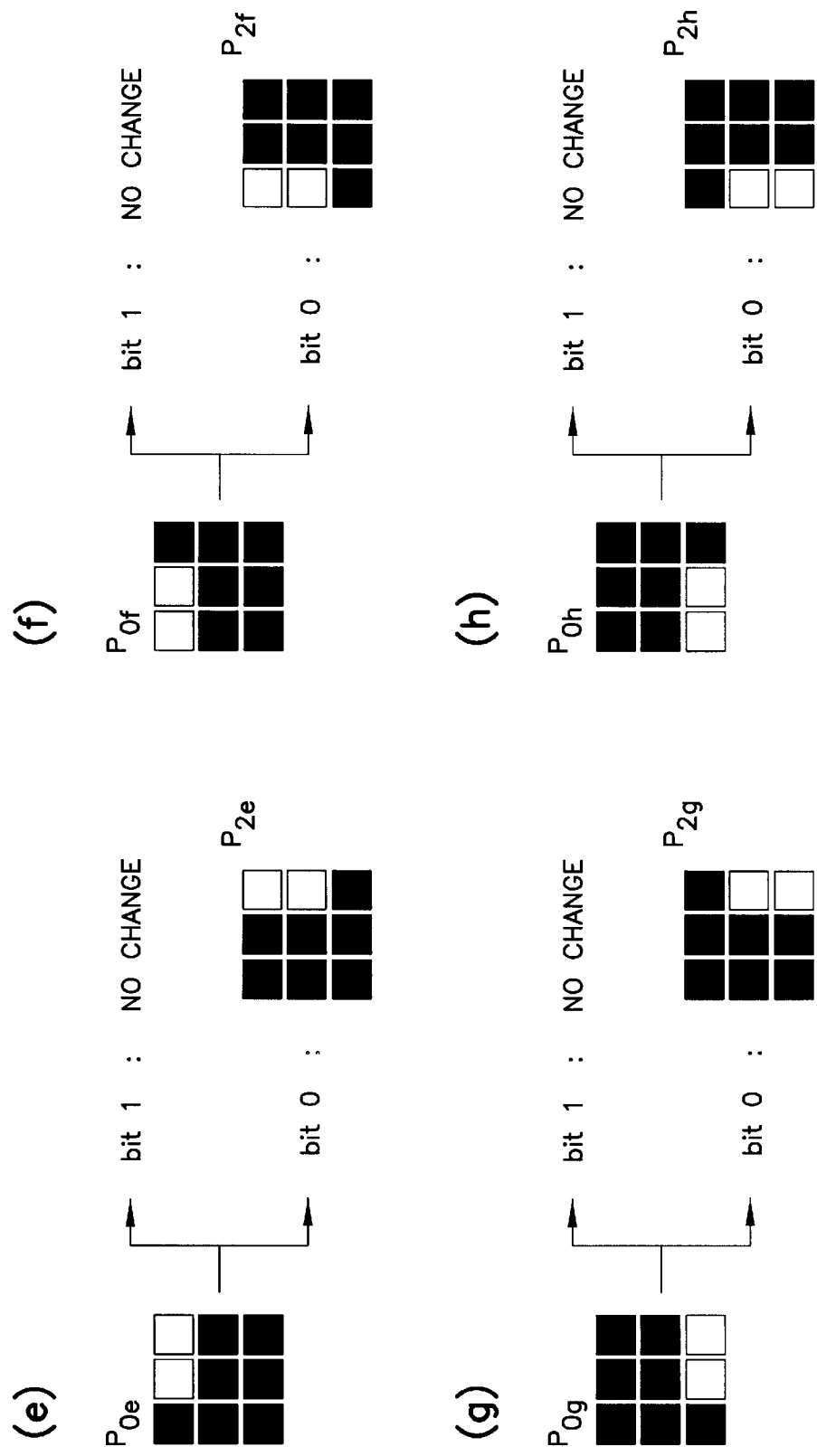
Figure 5C:
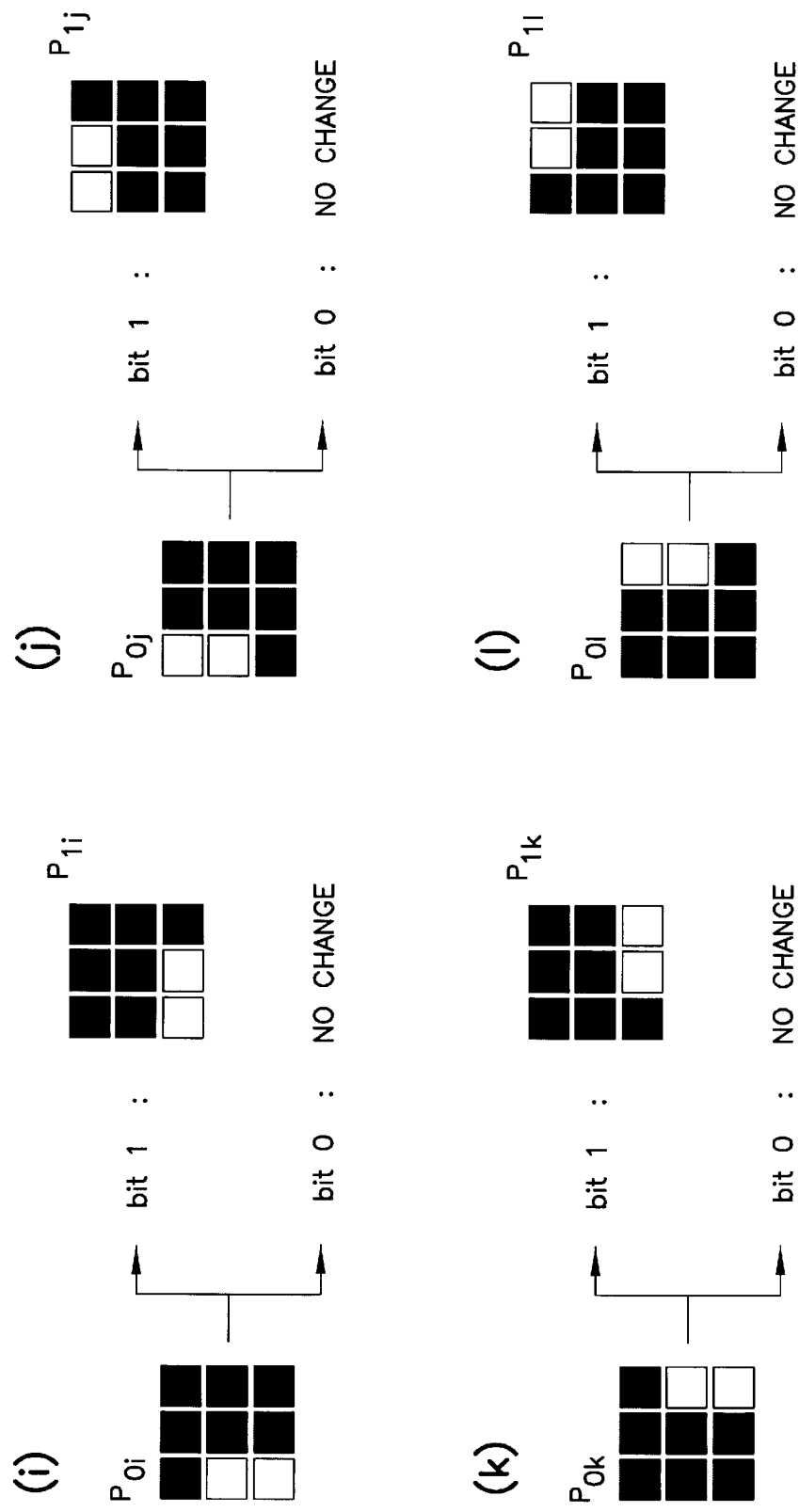

Now referring to FIGS. 5A–5C, a complete set of encoding patterns or information is illustrated. These patterns illustrate an encoding rule. Each encoding pattern is 3-by-3 window size. FIG. 5A shows a first sub-set of four predetermined pixel patterns $P_{0a}$ through $P_{0d}$ and the corresponding predetermined modified contiguous pixel patterns $P_{1a}$ through $P_{1d}$ and $P_{2a}$ through $P_{2d}$. For the sake of simplicity, these pixel patterns have binary values (i.e., on or 1 as indicated by a black square and off or 0 as indicated by a white square). For each one pixel pattern, there is a pair of the corresponding predetermined modified contiguous pixel patterns which are indicated by bit 1 and bit 0. For example, when a predetermined pixel pattern $P_{0a}$ is detected and bit 1 is specified, a predetermined modified contiguous pixel pattern $P_{1a}$ is used to replace the pixel pattern $P_{0a}$. Consequently, the original upper left corner off bit now has an additional right adjacent off bit as shown in the modified contiguous pixel pattern $P_{1d}$.

FIG. 5B shows a second sub-set of four predetermined contiguous pixels patterns $P_{0e}$ through $P_{0h}$ and the corresponding predetermined modified contiguous pixel patterns $P_{2e}$ through $P_{2h}$. The contiguous pixel patterns $P_{0e}$ through $P_{0h}$ as well as modified contiguous pixel patterns $P_{2e}$ through $P_{2h}$ each have two contiguous off pixels. However, the off pixels in the contiguous pixels patterns $P_{0e}$ through $P_{0h}$ are horizontally orientated while those of the modified contiguous pixel patterns $P_{2e}$ through $P_{2h}$ are vertically orientated. For each one pixel pattern, although there is a pair of the corresponding predetermined modified contiguous pixel patterns which are indicated by bit 1 and bit 0, the bit 1 selection replaces an original pixel pattern with the same pixel pattern.

FIG. 5C shows a third sub-set of four predetermined contiguous pixels patterns $P_{0i}$ through $P_{0l}$ and the corresponding predetermined modified contiguous pixel patterns $P_{1i}$ through $P_{1l}$. The contiguous pixel patterns $P_{0i}$ through $P_{0l}$ as well as modified contiguous pixel patterns $P_{1i}$ through $P_{1l}$ each have two contiguous off pixels. However, the off pixels in the contiguous pixels patterns $P_{0i}$ through $P_{0l}$ are vertically orientated while those of the modified contiguous pixel patterns $P_{1i}$ through $P_{1l}$ are horizontally orientated. For each one pixel pattern, although there is a pair of the corresponding predetermined modified contiguous pixel patterns which are indicated by bit 1 and bit 0, the bit 0 selection replaces an original pixel pattern with the same pixel pattern.

Still referring to FIGS. 5A through 5C, when one of the twelve contiguous pixels patterns $P_{0a}$ through $P_{0l}$ is detected in a current 3-by-3 pixel window, a corresponding one of the twenty-four modified contiguous pixel patterns $P_{1a}$ through $P_{1l}$ and $P_{2a}$ through $P_{2l}$ is used modify the original pixel pattern. The above described modification encodes the predetermined information as a digital watermark in an image without substantially affecting an appearance of an image. In certain binary images such as text, the above modification takes place in an area substantially near or on edges so as to reduce a change in two-dimensional topology of fonts. In selecting the corresponding modified contiguous pixel patterns, the selection is also based upon a bit specification (i.e., bit 0 or 1).

Figure 6:
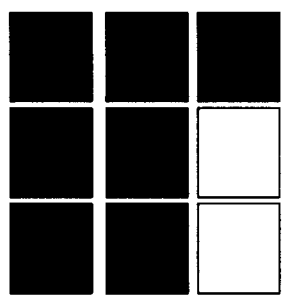
FIG. 6A shows a set of four pixel patterns that indicate the bit-1 encoded information.
FIG. 6B shows another set of four pixel patterns that indicate the bit-0 encoded information.
Figure 6:
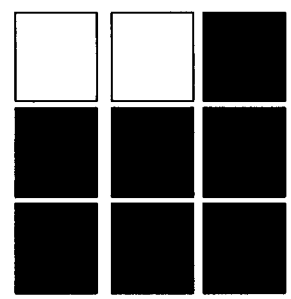
Figure 6:
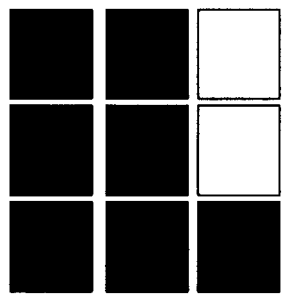
Figure 6:
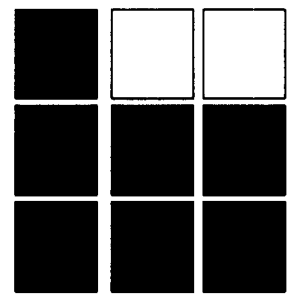
Figure 6:
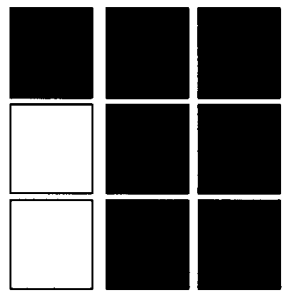
Figure 6:
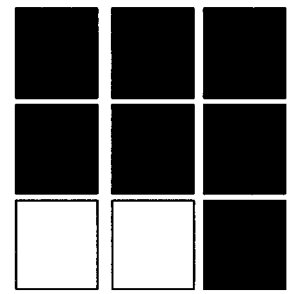
Figure 6:
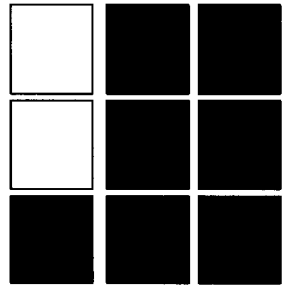
Figure 6:
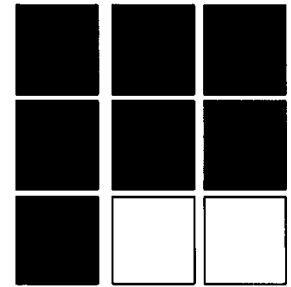

Now referring to FIGS. 6A and 6B, two sets of pixel patterns are shown to summarize the bit information after the modification has been made based upon the pixel patterns as shown in FIG. 5A–5C. FIG. 6A shows a set of four pixel patterns that indicate the bit-1 encoded information. In other words, in decoding the encoded image with a digital watermark, whenever one of the four pixel patterns as shown in FIG. 6A is detected, the bit-1 information or a value one is decoded. Similarly, FIG. 6B shows another set of four pixel patterns that indicate the bit-0 encoded information. In other words, in decoding the encoded image with a digital watermark, whenever one of the four pixel patterns as shown in FIG. 6B is detected, the bit-0 information or a value zero is decoded.

Figure 7:
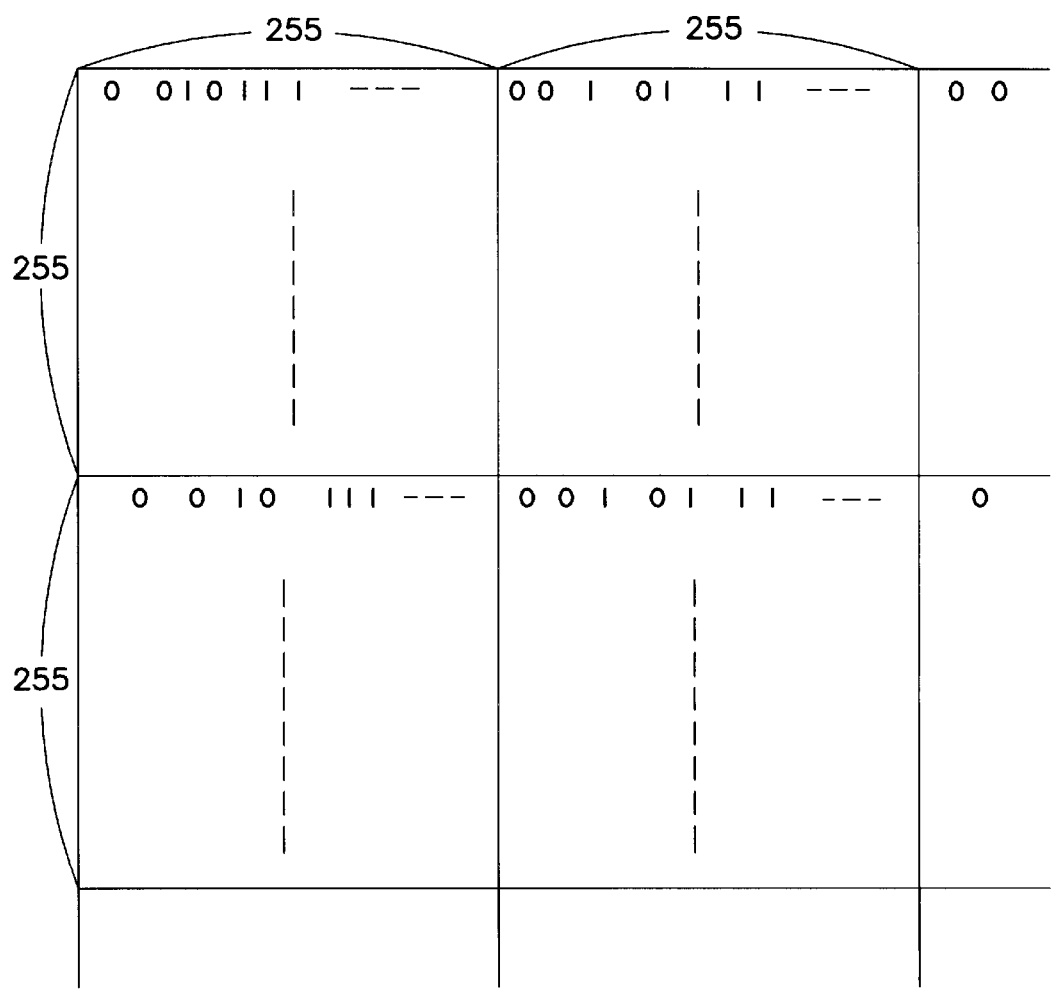
FIG. 7 illustrates an example of encoding a bit sequence of "0010111 . . . " as a digital watermark in each block of an input image.

FIG. 7 illustrates an example of encoding a bit sequence of "0010111 . . . " as a digital watermark in each block of an input image. The bit sequence or the encoded information is user-definable and is stored in a predetermined storage area. A block is indicated by 255 by 255. Within each block, the bit sequence is encoded. "0" in a block indicates a position where one of the predetermined contiguous pixel patterns as shown in FIGS. 5A–5C is detected and the pixel pattern has been modified to a bit-0 modified contiguous pixel pattern. Similarly, "1" in the block indicates a position where one of the predetermined contiguous pixel patterns as shown in FIGS. 5A–5C is detected and the pixel pattern has been modified to a bit-1 modified contiguous pixel pattern. Since each of the 255-by-255 pixel blocks may have a different image portion with a various sequence of pixel patterns, even though the same bit sequence is encoded in every pixel block, the position of the encoded bit sequence varies within each block based upon the pixel pattern of the image. For example, in the upper left block, the bit sequence is encoded in a relatively close with each other while in the adjacent upper middle block, the same bit sequence is encoded in a relatively far apart with each other in comparison. In other words, when an image is dense in a block, in general, the bit sequence is likely to be encoded in a relatively close area.

Figure 8:
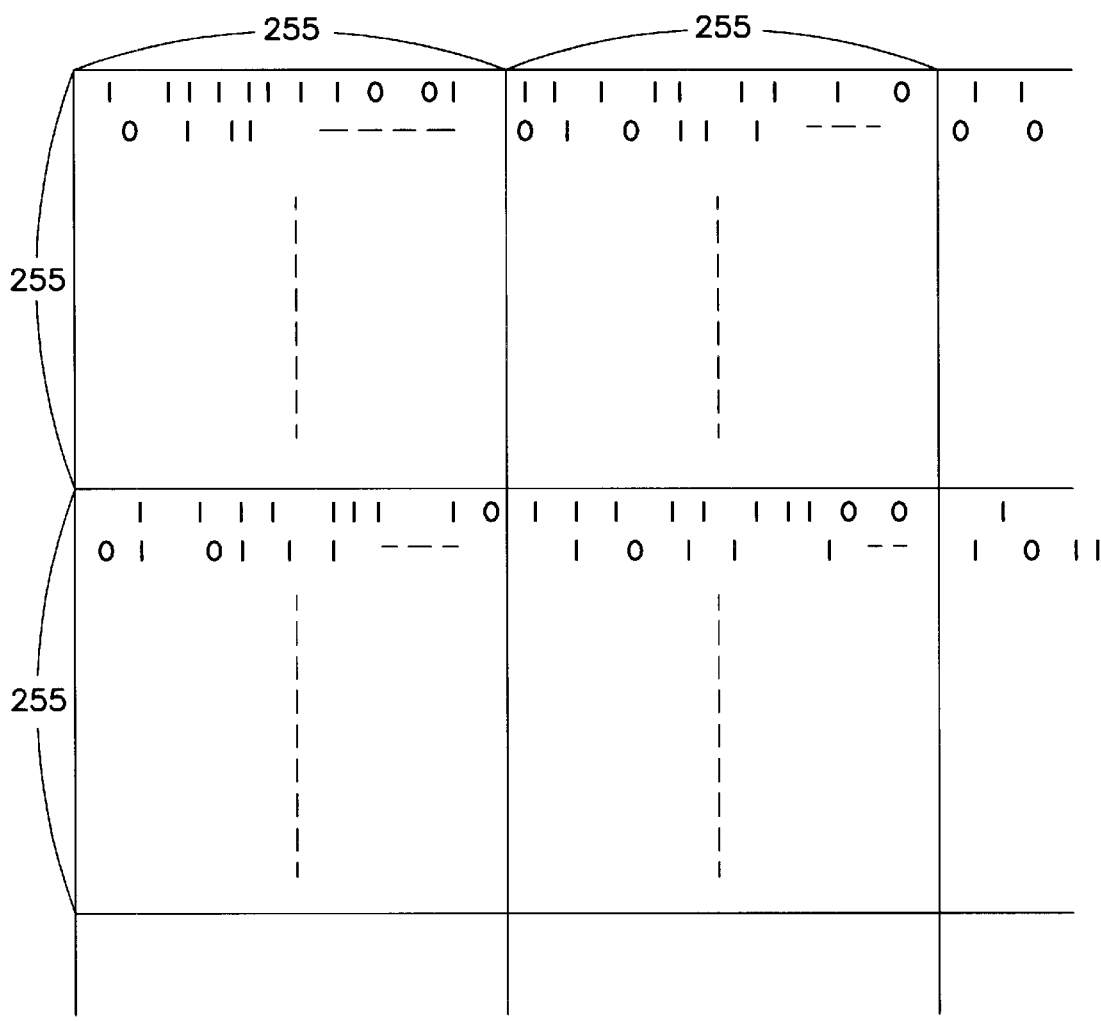
FIG. 8 is a diagram illustrating the insertion of a block identifier which indicates a beginning of each block.

Now referring to FIG. 8, in order to correctly decode the above described encoded information from the image, a block identifier is inserted to indicate a beginning of each block. The block identifier prevents the encoded image blocks from being incorrectly decoded by indicating when to start looking for the encoded information in each block. Furthermore, the block identifier also enables correct decoding in an encoded image even if a part of the encoded image is removed. This feature is particularly suitable for digital watermarks since a portion of digital images is easily copied or cut from the original digital images. For example, a bit sequence "11111111" is used as a block identifier to indicate a beginning of each block. Thus, as shown in each 255-by-255 pixel block, the block identifier "11111111" is inserted before the watermark bit sequence "0010111. As described above with respect to the watermark bit sequence, the location of each block identifier bit depends upon pixel patterns in the block. In addition to the block identifier and the watermark bit sequence, an error correction data or an error correction bit sequence is added to the watermark bit sequence.

Figure 9:
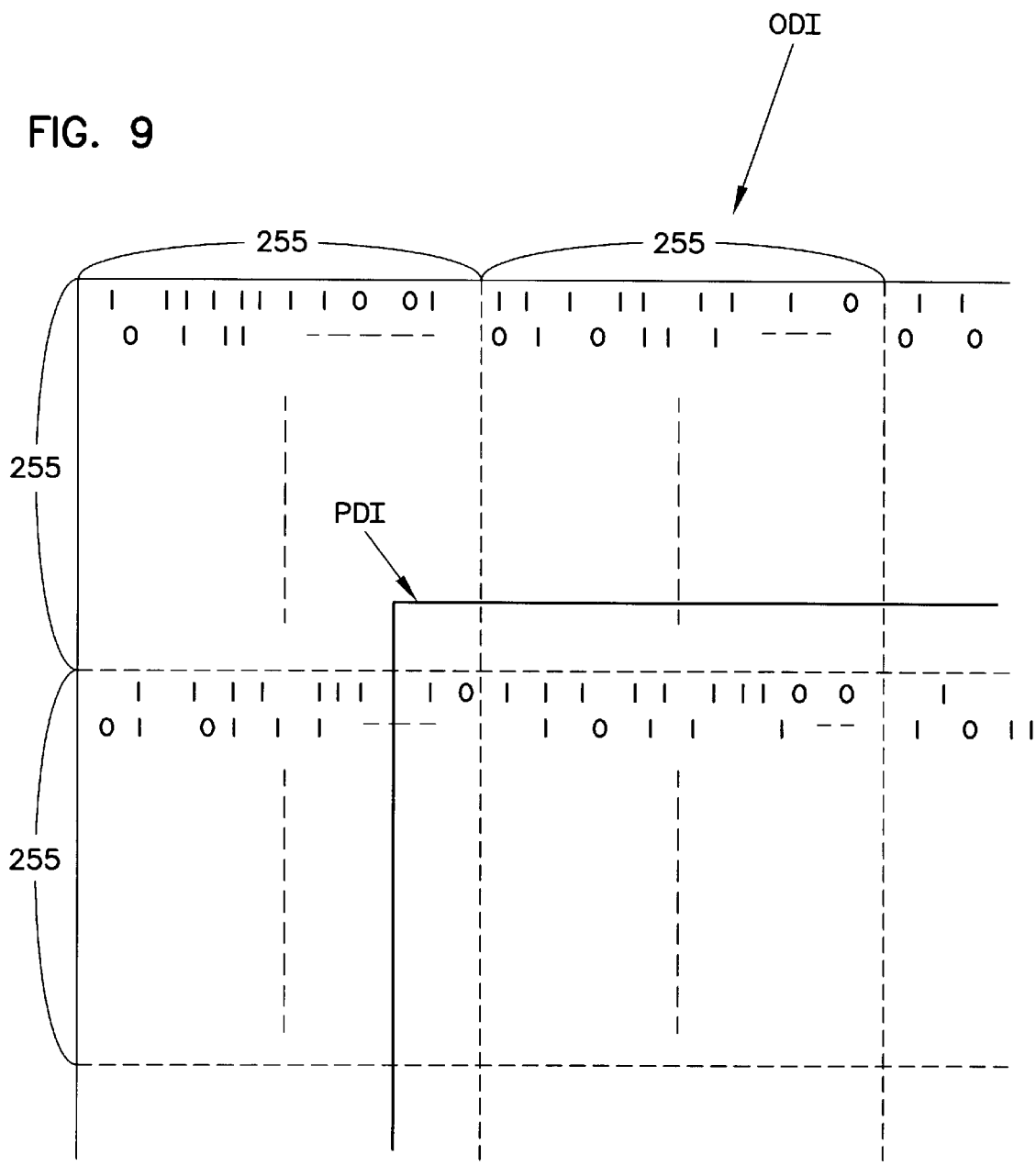
FIG. 9 illustrates an exemplary detection of a digital watermark in an isolated portion of an encoded image.

FIG. 9 illustrates an exemplary detection of a digital watermark in an isolated portion of an encoded image. After an author releases an original digital image ODI, when a portion of the digital image PDI is inappropriately copied, it is possible to determine whether or not the portion PDI contains a digital watermark based upon the above described decoding process. For example, the decoder unit 6 of FIG. 1 correctly performs the decoding process according to the current invention even tough the partially copied portion PDI does not coincide with the block boundaries as indicated by dotted lines. Assuming that the encoder 5 encodes a block identifier such as "11111111" at the beginning of each block, the decoder unit 6 first establishes a beginning of a block within the partial image by detecting the above block identifier. The detection of the block identifier is accomplished by moving a 3-by-3 pixel window within the partial image in a raster directions.

Figure 10:
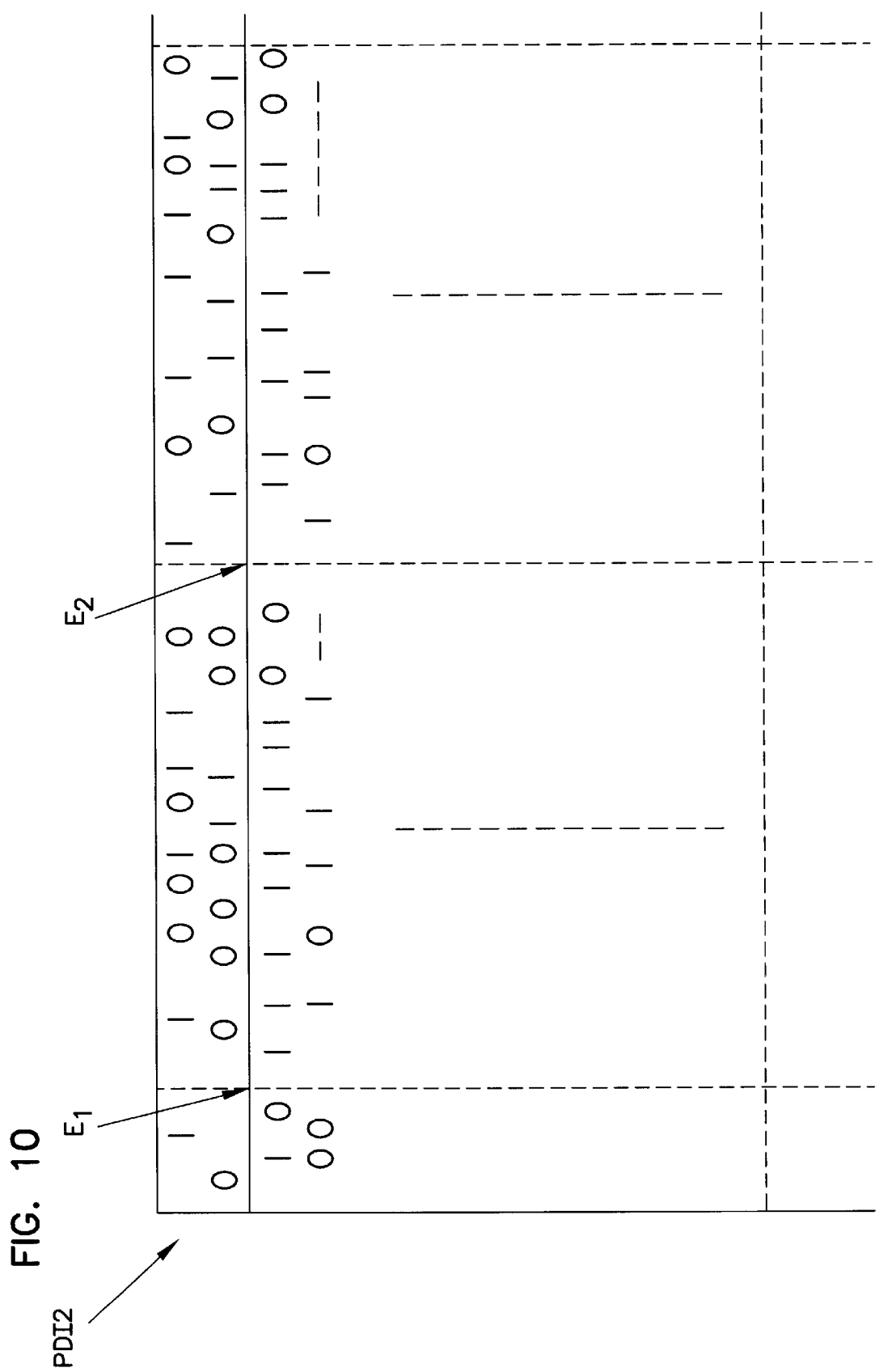
FIG. 10 is another example of detecting a digital watermark in an isolated portion of an encoded image.

Now referring to FIG. 10, another example of detecting a digital watermark in an isolated portion of an encoded image is further illustrated. A partial digital image PDI2 contains at least two blocks E1 and E2. It is possible to determine whether or not the portion PDI2 contains a digital watermark based upon the above described decoding process. Assuming that the encoder 5 encodes a block identifier such as "11111111" at the beginning of each block, the decoder unit 6 first establishes a beginning of a first block E1 within the partial digital image PDI2 by detecting the above block identifier. Then, it is determined whether or not a predetermined digital watermark follows the block identifier. After the process in the block E1 is completed, the decoder unit 6 moves onto a next block E2. Similarly, the decoder unit 6 first establishes a beginning of a second block E2 within the partial digital image PDI2 by detecting the above block identifier and determines the predetermined digital watermark follows the block identifier in the second block E2.

Figure 11:
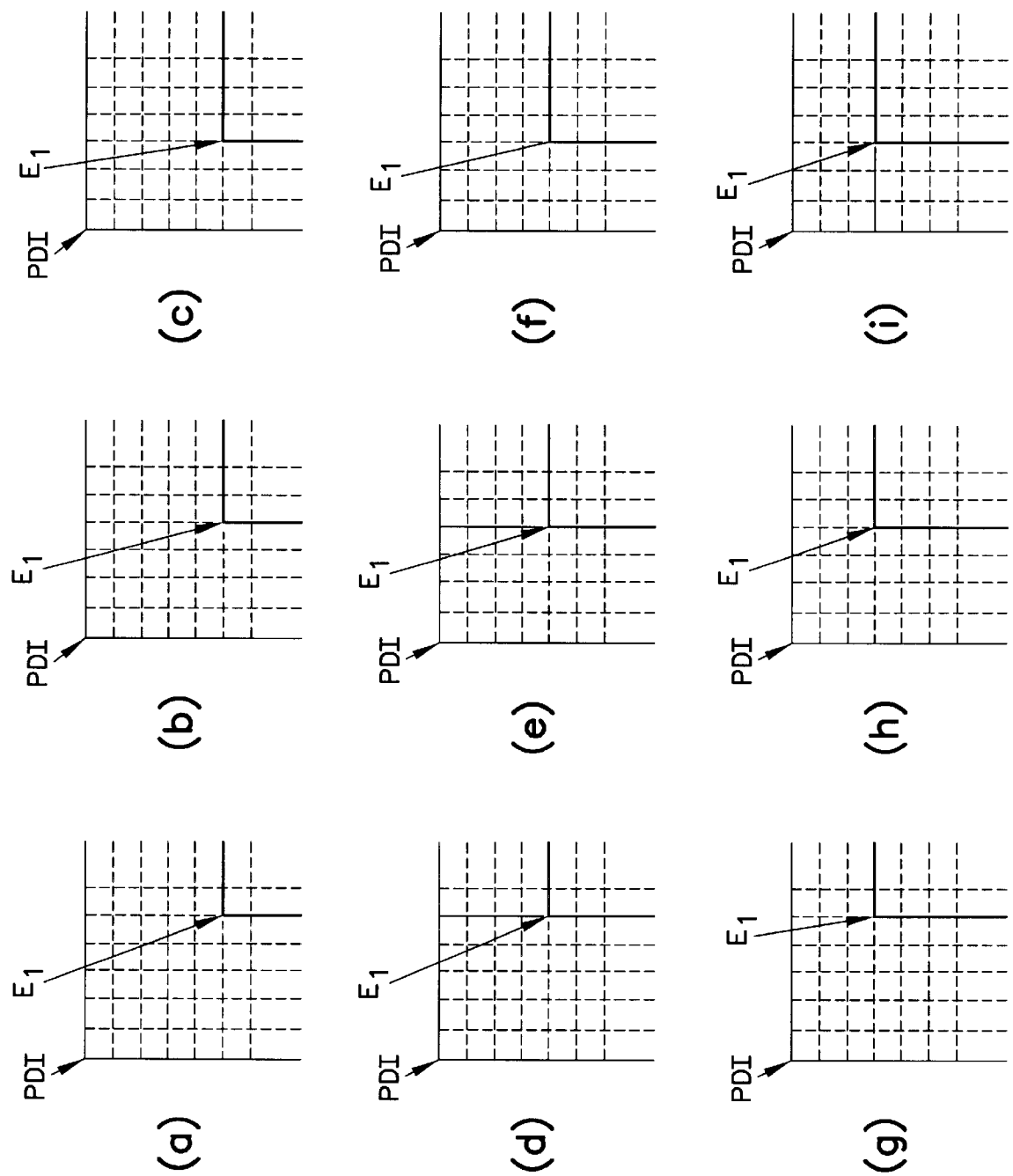
FIG. 11 shows nine exemplary ways for a partial digital image PDI to be copied from an original digital image.
Figure 12:
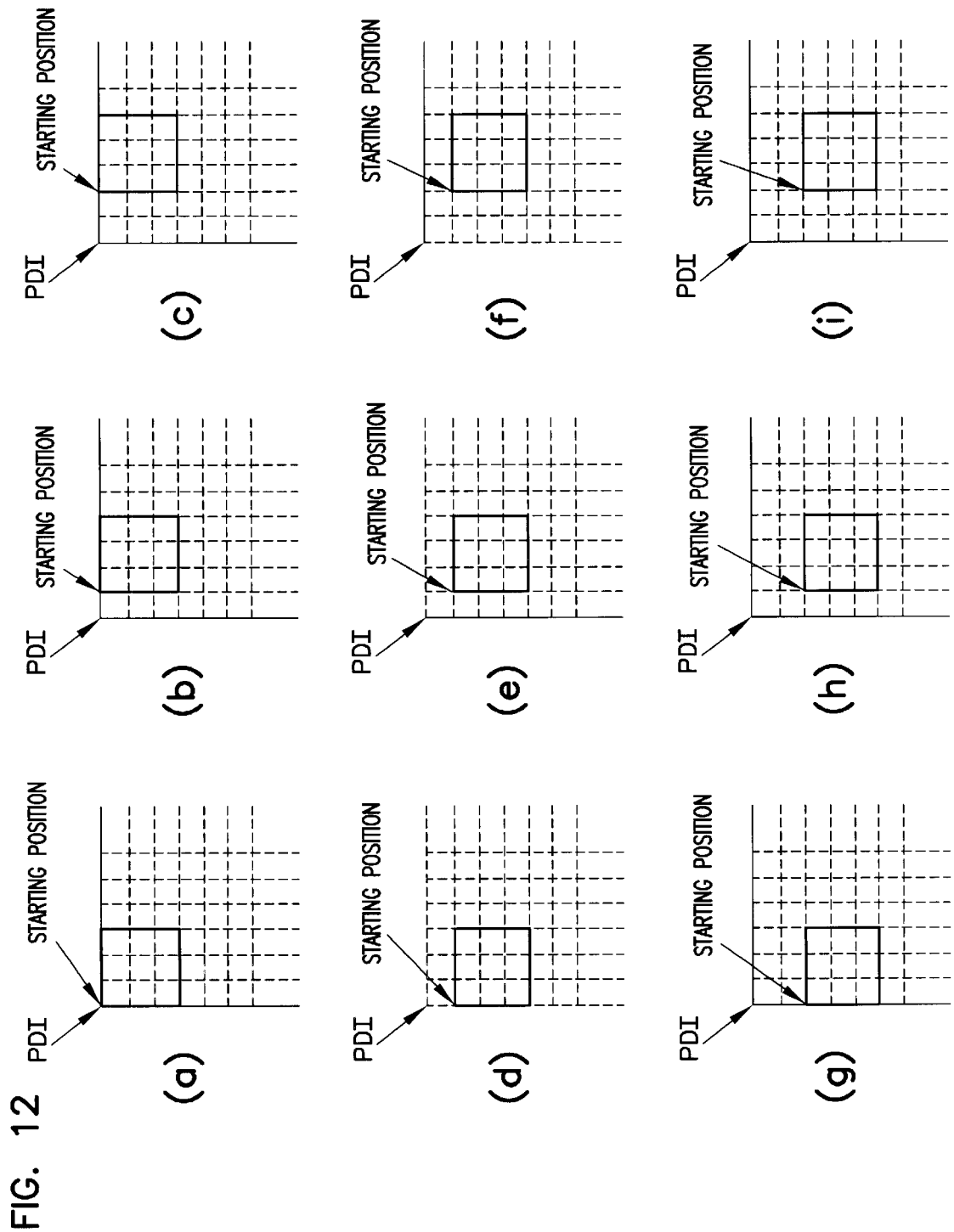
FIGS. 12(a) through (i) illustrate nine possible locations within the 3-by-3 pixel window positions for identifying a beginning portion of a block identifier.

FIG. 11 shows nine exemplary ways for a partial digital image PDI to be copied from an original digital image. In other words, the partial digital image PDI contains a block E1 at a different distance from its boundaries or edges depending upon how the partial digital image is cut from the original image. For example, when a partial digital image PDI contains a block E1 as shown in (i), a 3-by-3 pixel window is scanned from the upper left corner of the partial digital image PDI. When the pixel window is scanned downwardly by a multiple of three pixels as well as to the right also by a multiple of three pixels, the pixel window coincides with the upper left corner of the block E1 so as to correctly initiate a decoding process. On the other hand, when the partial digital image PDI contains a block E1 as shown in (a) through (h), since the distance between the block E1 and the upper left corner of the partial digital image PDI is not a multiple of three pixels, the 3-by-3 pixel window cannot be positioned to coincide with the upper left corner of the block E1. Consequently, the decoding process cannot be correctly initiated.

In order to solve the above described problem of establishing a correct starting position for the decoding process, for a 3-by-3 pixel window, nine possible locations within the 3-by-3 pixel window positions as shown in FIGS. 12(a) through (i) are considered in identifying a beginning portion of a block identifier. For example, if a partial digital image PDI contains a block E1 as shown in FIG. 11(a), after the pixel window is moved to three pixels in both vertical and horizontal directions, the nine possible locations as shown in FIG. 12(a) through (i) are used to identify the beginning of a block identifier. Thereafter, the pixel window is scanned by three pixels in either vertical or horizontal direction at a time.

Figure 13:
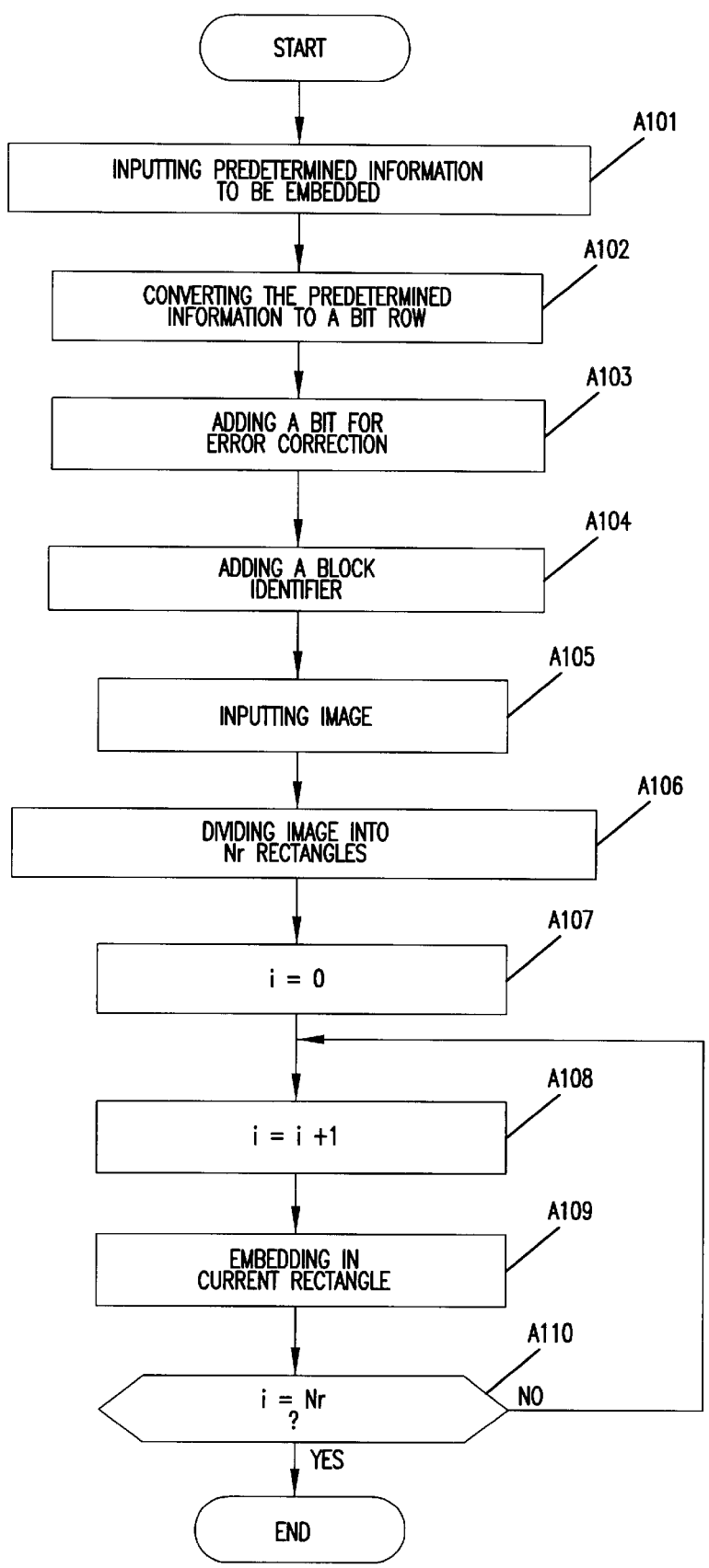
FIG. 13 is a flow chart illustrating acts involved in a preferred process of placing a digital watermark near or substantially along edges of an image according to the current invention.

Now referring to FIG. 13, a flow chart illustrates acts involved in a preferred process of placing a digital watermark near or substantially along edges of an image according to the current invention. Some of these acts will be described in reference to units of the system as illustrated in FIG. 1 or 2. In act A101, the information input unit 2 inputs into the memory unit 4 predetermined information to be encoded in an image. The predetermined information is a digital watermark and includes a character sequence and an image. The predetermined set of information to be embedded in the image is now converted into a bit sequence in act A102. In act A103, an error correction bit is added to the converted digital watermark bit sequence. Furthermore, an additional set of bits is added to the converted bit sequence as a block identifier in act A104. As described above, the block identifier bit sequence signifies a beginning of each block. In act A105, the image input unit 1 inputs digital data representing an original image into the memory unit 4 while the rectangular division unit 3 divides the input image into Nr number of blocks of a predetermined size in act A106. As described above, in one exemplary act, all areas including blank areas of the input image is divided into blocks. On the other hand, in another exemplary act, only areas including actual images are divided into blocks.

Still referring to FIG. 13, after the blocks are established, each block is processed in the following manner. A counter i is initialized to zero in act A107, and the counter is incremented for each block in act A108. In act A109, when a contiguous pixel pattern of the input image in a pixel window at a current position matches one of predetermined pixel patterns, the input image pixel pattern is replaced with one of corresponding predetermined modified contiguous pixel patterns. The act A109 is repeated in a raster scanning direction within the block. After completing the act A109, it is determined whether or not the last block is processed in act A110 by comparing the counter value to the Nr value. If not all blocks are processed, the preferred process goes back to the act A108. On the other hand, all blocks have been processed, the preferred process terminates.

Figure 14A:
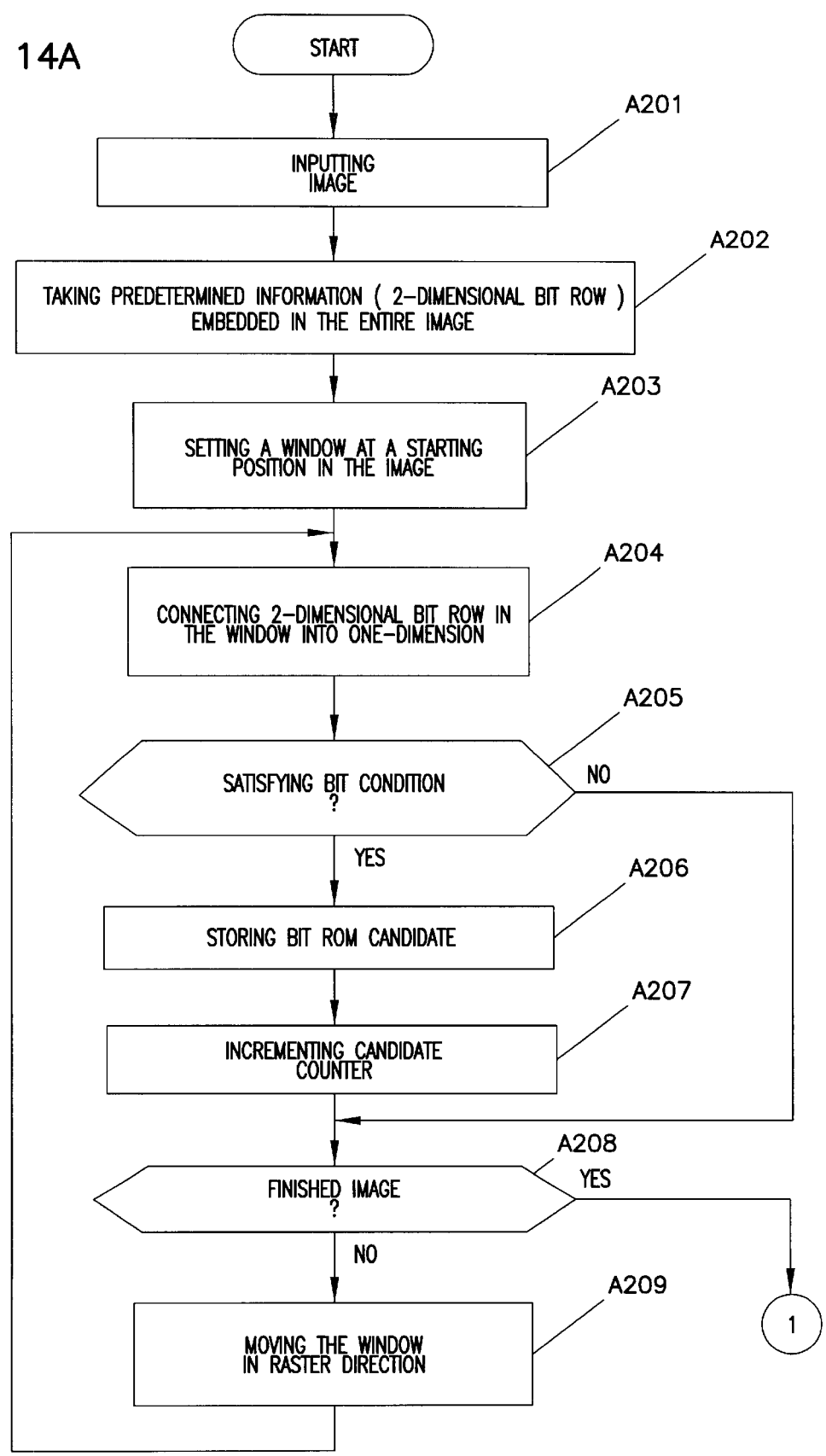
FIGS. 14A and 14B are a flow chart illustrating acts involved in a preferred process of decoding a digital watermark near or substantially along edges of an image according to the current invention.
Figure 14B:
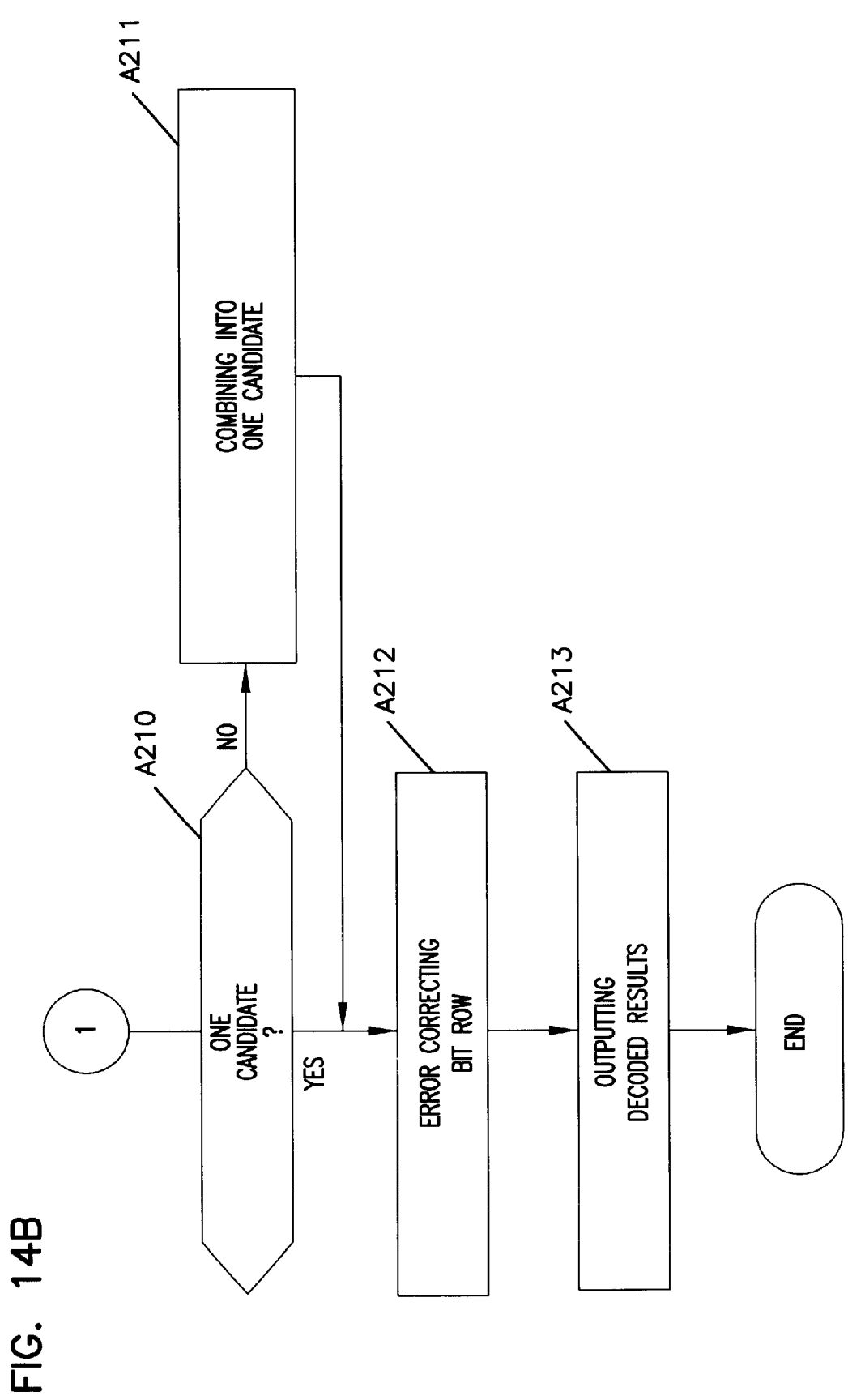

Now referring to FIGS. 14A and 14B, a flow chart illustrates acts involved in a preferred process of decoding a digital watermark near or substantially along edges of an image according to the current invention. Some of these acts will be described in reference to units of the system as illustrated in FIG. 1 or 2. In act A201, the image input unit 1 inputs digital data representing an encoded image or an original image with a digital watermark into the memory unit 4. In act A202, the encoded information is extracted from the entire encoded image. The extracted information is in a two-dimensional bit sequence. In act A203, a 3-by-3 pixel window used in encoding is placed at a beginning of the two-dimensional bit sequence. Subsequently, in act A204, the two-dimensional bit sequence is converted into a one-dimensional bit sequence in the same raster scanning order. It is also possible to directly extract the one-dimensional bit sequence without first storing in the two-dimensional bit sequence. However, it is advantageously faster to first store in the two-dimensional bit sequence and then to convert it into the one-dimensional bit sequence. That is, without the two-dimensional bit sequence, the original input image size remains for the rest of processing. On the other hand, when the two-dimensional bit sequence is first generated, the size of the image data is reduced to 1/9 of the original input image due to the 3-by-3 pixel window size, and the processing speed is increased.

Still referring to FIG. 14A, after the one-dimensional bit sequence is generated, the rest of the preferred process focuses upon acts of decoding the information. In act A205, it is determined whether or not the one-dimensional bit sequence represents a block identifier. If it does not satisfy the condition for the block identifier, the preferred process moves to act A208. On the other hand, if the one-dimensional bit sequence is a block identifier, the one-dimensional bit sequence is stored as a candidate in act A206, and a number of candidates is incremented by one in act A207. In act 208, at this juncture, it is determined whether or not scanning has covered the end of the image. If the scanning has not completed, the preferred process returns to the act A204 after scanning the pixel window in a raster direction in act A209.

Now referring to FIG. 14B, if the scanning has completed, it is further determined whether or not the number of candidates is plural in act A210. If a plurality of candidates exists, act A211 converges the multiple candidates into a single candidate. In general, one way to converge the candidates is to take a bit-by-bit vote in order to adapt highly reliable bit values. In case only a single candidate exists, the preferred process proceeds to act A212. Using an error correction data in the bit sequence, the bit sequence is error corrected in act A212. Lastly, the decoded information is outputted in act A213. As described above, using the predetermined contiguous pixel patterns as shown in FIGS. 5A–5C, predetermined information as a digital watermark is encoded in an image without substantially affecting the appearance of the image. When an encoded image is copied in portion or entirety, it is later possible to prove the authorship of the copy by decoding the copied image. For example, the predetermined information to be encoded includes the date of creation, a serial number for a copier and so on. Furthermore, in electronic communication, information can be anonymously sent, and the sender's name or source is encoded as a digital watermark.

Now referring to FIG. 15, when a partial digital image contains a plurality of blocks, each block is decoded and the decoded results from the multiple blocks are converged into one result. This convergence is performed to increase the accuracy of the decoding results. One way to converge the individual decoded results is to take a majority vote for each bit among the decoded results from a plurality of blocks. According to the majority vote rule, if the majority of the decoded results have a bit value of one, then the converged bit result also becomes one. Similarly, if the majority of the decoded results have a bit value of zero, then the converged bit result also becomes zero. For example, in the fourth bit from the left, decoded result 1 has a bit value of one while decoded results 2 and 3 each have a bit value of zero. Thus, the converged bit result for the fourth bit becomes zero.

Figure 16:
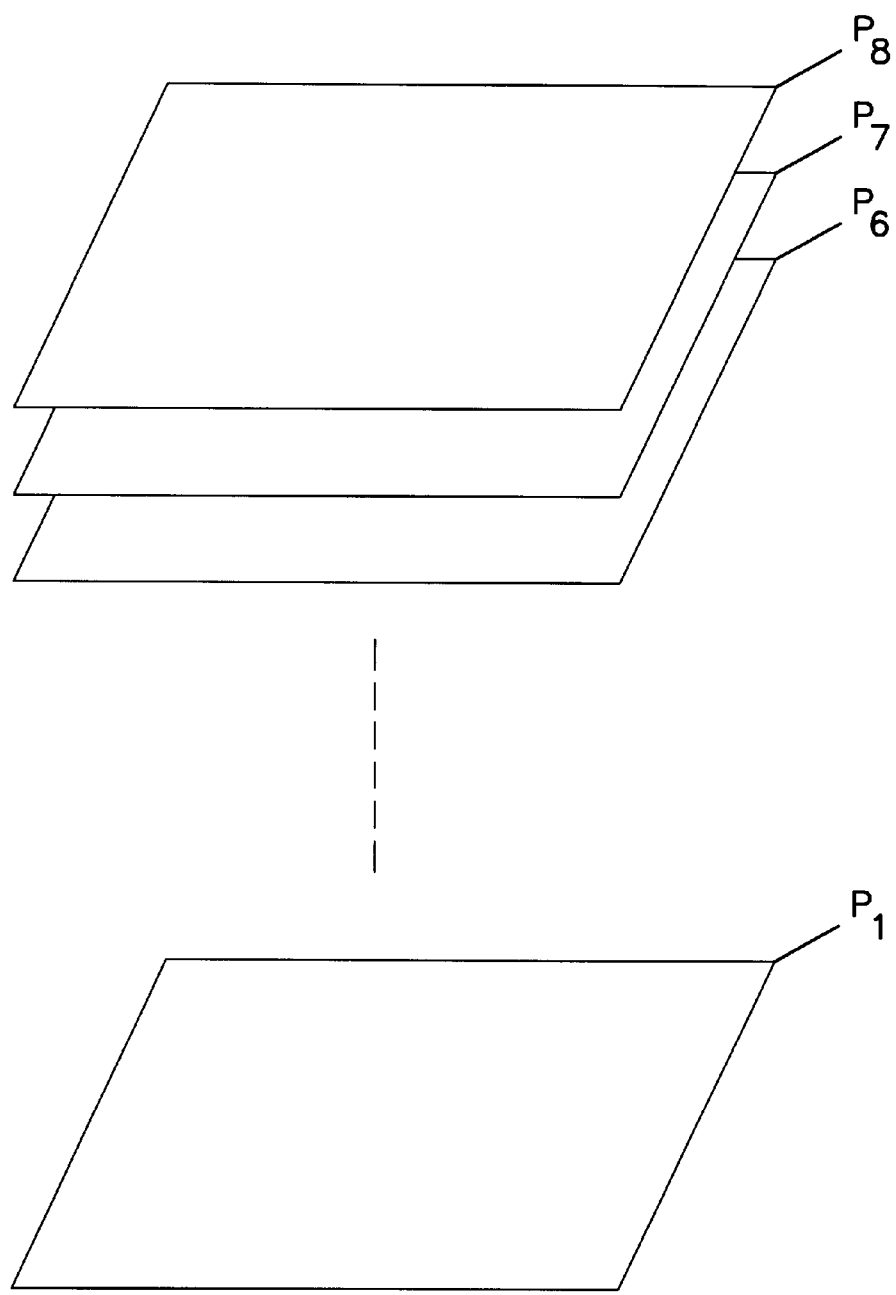
FIG. 16 illustrates a set of bit planes P1 through P8 where color values are represented by a set of binary values for each pixel.

An alternative embodiment of the pixel-based digital watermarks system for placing a digital watermark near or substantially along edges of an image according to the current invention involves input images with bit planes or multi colors. FIG. 16 illustrates a set of bit planes P1 through P8 where color values are represented by a set of binary values for each pixel. The number of bit planes determines the number of colors to be expressed by each pixel. In this example, eight bit planes enable 256 colors for each pixel. Each bit plane is expressed by binary values in two dimension. One of the eight bit planes is selected, and the above described pixel modification is performed to encode predetermined information as a digital watermark based upon a set of predetermined pixel, patterns. For example, the encoder unit 5 scans a bit plane P1 to encode a digital watermark as described above. Similarly, the decoder unit 6 also performs the decoding process on the selected bit plane P1 in order to decode the embedded information. Another alternative embodiment according to the current invention can use a pixel window of 2-by-2 pixel size and 4-by-4 pixel size. However, the 2-by-2 pixel window appears to contain relative little bit information while the 4-by-4 pixel window appears to contain too much bit information. The 3-by-3 pixel window appears to include appropriate amount of bit information.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of placing a digital watermark in an image, comprising the acts of:
   determining information to be placed in the digital watermark;
   determining a set of predetermined contiguous pixel patterns of a particular size and at least another set of corresponding predetermined modified contiguous pixel patterns for encoding the digital watermark;
   inputting an input image containing an image and image edges along the image;
   detecting one of the predetermined contiguous pixel patterns in the input image; and
   modifying the input image according to the corresponding predetermined modified contiguous pixel patterns so as to encode the digital watermark based upon the detected one of the predetermined contiguous pixel patterns.

2. The method of placing a digital watermark in an image according to claim 1 wherein said inputting act further comprising an additional act of dividing the input image into blocks.

3. The method of placing a digital watermark in an image according to claim 2 wherein said detecting act and said modifying act are repeated until every one of the blocks is processed.

4. The method of placing a digital watermark in an image according to claim 3 wherein each of the blocks is determined to include at least a part of the input image.

5. The method of placing a digital watermark in an image according to claim 2 wherein the block includes a block identifier.

6. The method of placing a digital watermark in an image according to claim 5 further comprising an act of decoding the digital watermark based upon the block identifier.

7. The method of placing a digital watermark in an image according to claim 2 wherein data representing the image has multi values.

8. The method of placing a digital watermark in an image according to claim 7 wherein the multi values are organized in bit planes, said detecting act detecting one of the predetermined contiguous pixel patterns on a particular one of the bit planes in each of the pixel blocks in the input image, said modifying act modifying the input image so as to encode the digital watermark on the particular bit plane based upon the detected one of the predetermined contiguous pixel patterns and the corresponding predetermined modified contiguous pixel patterns.

9. The method of placing a digital watermark in an image according to claim 1 further comprising an act of decoding the digital watermark.

10. The method of placing a digital watermark in an image according to claim 1 wherein the input image includes text.

11. The method of placing a digital watermark in an image according to claim 1 wherein data representing the image has binary values.

12. The method of placing a digital watermark in an image according to claim 1 wherein said inputting act additionally inputs additional information on the digital watermark, said modifying act encoding one of the corresponding predetermined modified contiguous pixel patterns of a particular set based upon the digital watermark.

13. The method of placing a digital watermark in an image according to claim 1 wherein said modifying step encodes information on the digital watermark with error correction data.

14. A system for placing a digital watermark in an image, comprising:
   a pixel pattern storage unit for storing a set of predetermined contiguous pixel patterns of a particular size and at least another set of corresponding predetermined modified contiguous pixel patterns;
   an input unit for inputting an input image, the input image containing an image and image edges along the image; and
   an encoder unit connected to said pixel pattern storage unit for detecting one of the predetermined contiguous pixel patterns in the input image and for modifying the input image according to the corresponding predetermined modified contiguous pixel patterns so as to encode the digital watermark based upon the detected one of the predetermined contiguous pixel patterns.

15. The system for placing a digital watermark in an image according to claim 14 wherein said input unit further comprises an input image divider unit for dividing the input image input into blocks of a predetermined size.

16. The system for placing a digital watermark in an image according to claim 15 wherein each of the blocks is determined to include at least a part of the input image.

17. The system for placing a digital watermark in an image according to claim 15 wherein the dividing unit adds a block identifier to each of the blocks.

18. The system for placing a digital watermark in an image according to claim 17 further comprising a decoder for decoding the digital watermark based upon the block identifier.

19. The system for placing a digital watermark in an image according to claim 15 wherein data representing the image is represented by multi values.

20. The system for placing a digital watermark in an image according to claim 19 wherein the multi values are organized in bit planes, said encoder unit further comprises a bit plane pixel pattern detecting unit for detecting one of the predetermined contiguous pixel patterns on a particular one of the bit planes in each of the pixel blocks in the input image.

21. The system for placing a digital watermark in an image according to claim 20 wherein said encoder unit further comprises a bit plane encoder unit for modifying the input image so as to encode the digital watermark on the particular bit plane based upon the detected one of the predetermined contiguous pixel patterns and the corresponding predetermined modified contiguous pixel patterns.

22. The system for placing a digital watermark in an image according to claim 14 further comprising a decoding unit for decoding the digital watermark.

23. The system for placing a digital watermark in an image according to claim 14 wherein the input image includes text.

24. The system for placing a digital watermark in an image according to claim 14 wherein data representing the image is represented by binary values.

25. The system for placing a digital watermark in an image according to claim 14 wherein said encoder encodes information on the digital watermark at a specified bit based upon one of the corresponding predetermined modified contiguous pixel patterns of a particular set.

26. The system for placing a digital watermark in an image according to claim 14 wherein said encoder encodes information on the digital watermark with error correction data.

* * * * *